(12) United States Patent
Nakagawa

(10) Patent No.: US 6,425,698 B2
(45) Date of Patent: Jul. 30, 2002

(54) CAMERA SHUTTER WITH PLURAL BLADES

(75) Inventor: Tadashi Nakagawa, Narashino (JP)

(73) Assignee: Seiko Precision Inc. (JP)

( * ) Notice: Subject to any disclaimer, the term of this patent is extended or adjusted under 35 U.S.C. 154(b) by 0 days.

(21) Appl. No.: 09/824,399

(22) Filed: Apr. 2, 2001

(30) Foreign Application Priority Data

Mar. 31, 2000 (JP) ........................................ 2000-099119

(51) Int. Cl.$^7$ ................................................. G03B 9/40
(52) U.S. Cl. ........................................ 396/484; 396/489
(58) Field of Search ................................ 396/484, 487, 396/489, 486

(56) References Cited

U.S. PATENT DOCUMENTS 4,150,890 A * 4/1979 Nakagawa et al. ......... 396/486
5,335,036 A * 8/1994 Aoshima .................... 396/484

* cited by examiner

*Primary Examiner*—David M. Gray
(74) *Attorney, Agent, or Firm*—Adams & Wilks

(57) ABSTRACT

A camera shutter has a set of opening shutter blades and a set of closing shutter blades. A shutter driver mechanism alternately displaces the opening and closing shutter blades to a first position wherein the blades are fanned-out and cover a shutter opening and a second position wherein the blades are retracted and do not cover the shutter opening. The shutter driver mechanism has an engaging pawl having a lower protrusion that pushes an upper protrusion on the top surface of an arm that supports the shutter blades when they are in the first position to thereby urge the shutter blades into intimate contact with each other. Prior to the start of an exposure, the lower protrusion stops pushing the upper protrusion so that the shutter blades can move freely during an exposure operation.

14 Claims, 4 Drawing Sheets

CAMERA SHUTTER WITH PLURAL BLADES

BACKGROUND OF THE INVENTION

1. Field of the Invention

The present invention relates generally to a shutter for use in a camera and, more particularly, to a camera shutter with plural shutter blades.

2. Description of the Related Art

One conventional focal plane shutter for use in a camera has a set of opening shutter blades and a set of closing shutter blades disposed behind base plates each of which is provided with a shutter opening. The two sets of shutter blades operate in sequence to alternately cover and uncover the shutter openings. The shutter blades of each set are supported by arms forming parallel links. The opening and closing shutter blades are actuated to open and close the shutter openings. Each shutter blade is normally made of a sheet of a metal or the like.

Since each shutter blade is made of a metal sheet, intimate contact between the successive shutter blades is poor. To maintain sufficient lightproofness, it has been necessary to crimp the blades in a direction to bring them into intimate contact with each other by a sophisticated machining or processing technique. If they are pressed against each other so that they make intimate contact with each other, a large frictional force acts on each at the start of actuation thereof. This makes the control of the exposure time inaccurate.

SUMMARY OF THE INVENTION

Accordingly, it is an object of the present invention to provide a camera shutter which can be fabricated without the need of sophisticated machining or processing techniques.

It is another object of the invention to provide a camera shutter having plural shutter blades capable of making contact with each other with improved intimateness to thereby provide enhanced lightproofness and which permits smooth and accurate control of exposure time.

A camera shutter with plural separate blades in accordance with the present invention has at least two base plates each provided with a shutter opening, the blades being mounted between the base plates, and a shutter driver mechanism for moving the blades between a first position at which the blades are extended and cover the shutter opening and a second position at which the blades are retracted and do not cover the shutter opening. A pushing member protrudes from either one of the base plates toward the shutter blades in the first position and pushes the shutter blades into intimate contact with each other. Prior to the start of an exposure, the pushing member stops pushing the shutter blades. In this structure, the shutter blades make contact with each other with improved intimateness, thus improving the lightproofness. Moreover, by releasing the pushing action of the pushing member prior to the start of an exposure, the shutter blades can move freely and thus the exposure time can be controlled smoothly and precisely.

Preferably, each of the shutter blades has a protrusion capable of bearing against the pushing member. Furthermore, the pushing member is preferably mounted within the shutter driver mechanism.

DESCRIPTION OF THE PREFERRED EMBODIMENTS

Figure 1:
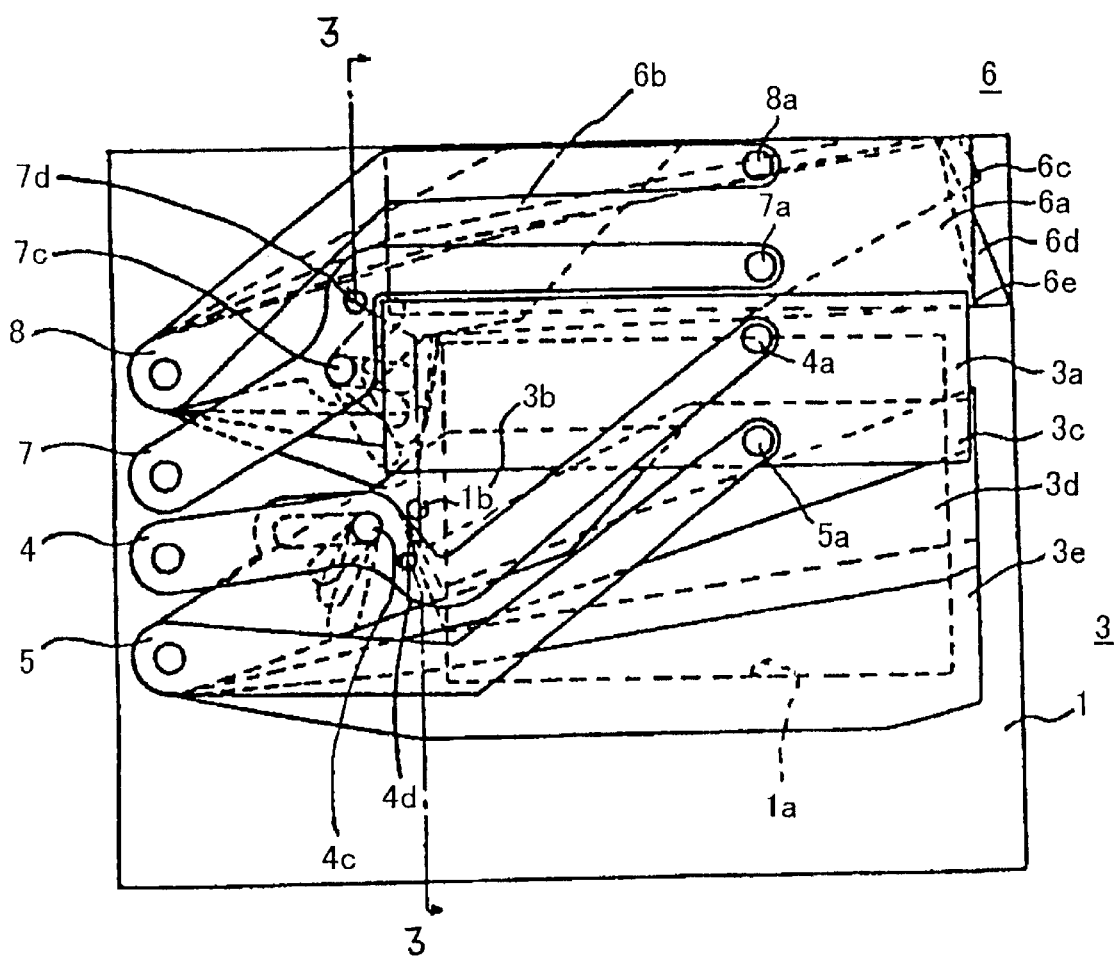
FIG. 1 is a plan view of a set of opening shutter blades in accordance with the present invention showing the blades in their extended, set state.
Figure 2:
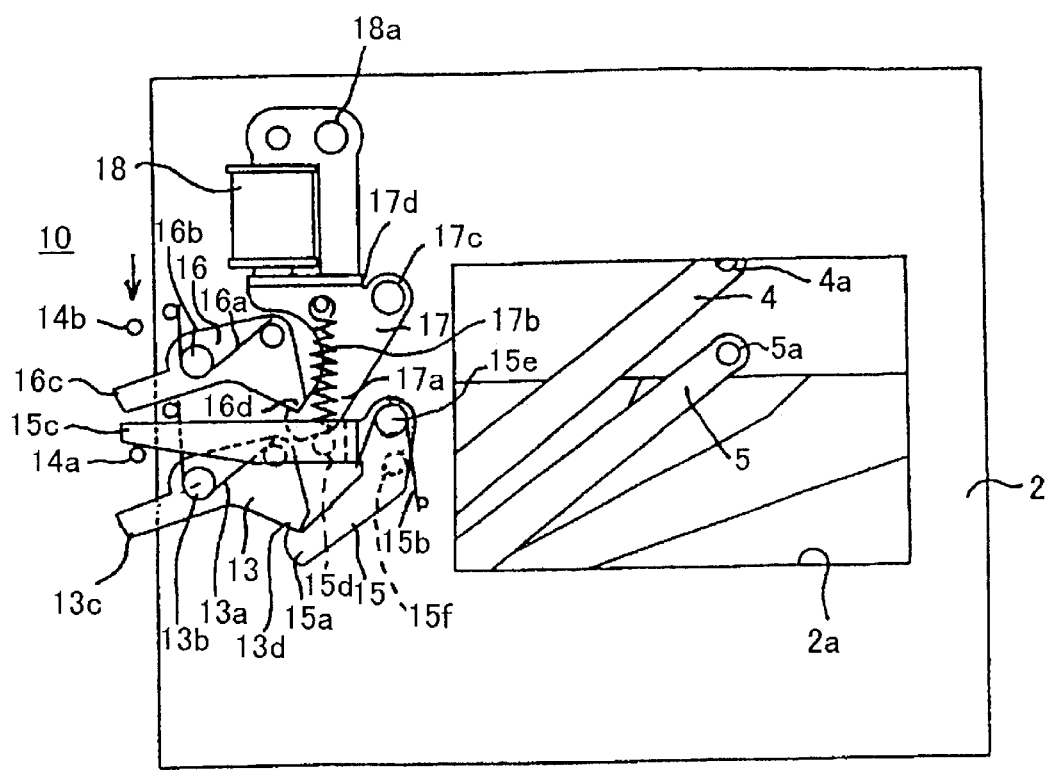
FIG. 2 is a plan view of a shutter driver mechanism showing the mechanism in its set state.
Figure 3:
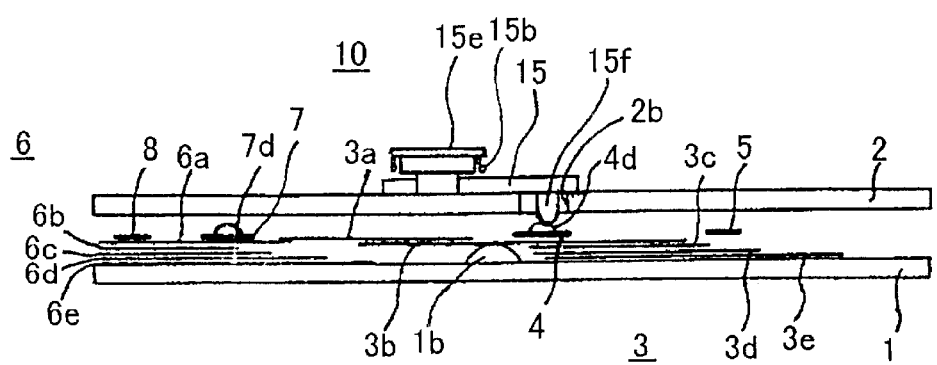
FIG. 3 is a cross-sectional view taken on line 3—3 of FIG. 1.

Referring to FIGS. 1 through 3, there is shown a camera shutter embodying the present invention. The shutter has a first base plate 1 and a second base plate 2 which are similar in shape. The base plates 1 and 2 are superposed one over the other and spaced apart a given distance from each other. The base plates 1 and 2 are provided with shutter openings 1a and 2a, respectively. A set of opening shutterblades 3 for starting an exposure and a set of closing shutter blades 6 for terminating the exposure are located in the gap between the two base plates 1 and 2. The two sets of blades 3 and 6 are so held as to be capable of being moved or displaced between a first, extended, fanned-out position at which the blades overlap and cover the shutter openings 1a and 2a, respectively, and a second, retracted position at which the blades expose the shutter openings.

The set of opening shutter blades 3 consists of small separate blades 3a–3e. Similarly, the set of closing shutter blades 6 consists of small separate blades 6a–6e. The two sets of blades are mounted to the left end of the base plate 1 as viewed in the drawings. As shown in FIGS. 1 and 3, the set of opening shutter blades 3 is supported by opening arms 4 and 5. The set of closing shutter blades 6 is supported by closing arms 7 and 8. The opening arms 4 and 5 have pins 4a and 5a at their respective front ends, and the pins 4a and 5a are coupled to the shutter blade 3a. The pins 4a and 5a are translated between the first and second positions by swinging the opening arm 4. A pin 4c stands upright on the opening arm 4 and fits in guide grooves formed in the shutter blades 3b–3e. The pin 4c is swung between the first and second positions by swinging the opening arm 4. An upper protrusion 4d protrudes from the upper surface of the opening arm 4 toward the second base plate 2. The operation of the shutter will be described hereinafter.

The structure for supporting the set of closing shutter blades 6 by means of the closing arms 7 and 8 is similar to the above-described structure for supporting the set of opening shutter blades 3, and the mounting structure has pins 7a and 8a which are coupled to and translate the shutter blade 6a. The shutter blades 6b–6e are swung and moved by a pin 7c. The operation of an upper protrusion 7d will be described below.

Referring particularly to FIG. 2, a shutter driver mechanism 10 is mounted on the left end of the second base plate 2. The shutter driver mechanism comprises an opening driver lever 13 rotatably mounted to a shaft 13b and biased in a clockwise direction by a spring 13a. A set protrusion 13c is mounted at the left end of the opening driver lever 13. When the shutter is in its set state, a shutter set pin 14a actuated by a well-known means (not shown) engages the set protrusion 13c, rotating the opening driver lever 13 in a counterclockwise direction into the position shown in FIG.

2 against the biasing force of the spring 13a. The opening driver lever 13 has an engaging portion 13d at the right end. An engaging pawl 15 is pivoted to a shaft 15e and biased in a clockwise direction by a spring 15b. A pawl 15a capable of engaging the engaging portion 13d is mounted at one end of the engaging pawl 15. A working arm 15c is mounted at the other end of the engaging pawl 15. A holddown pin 15d and a lower protrusion 15f protrude from the lower surface of the engaging pawl 15, the lower protrusion 15f forming a holddown member.

A closing driver lever 16 is pivoted to a shaft 16b and biased in a clockwise direction by a spring 16a. A set protrusion 16c is formed at the left end of the closing driver lever 16. When the shutter is in its set state, a shutter set pin 14b actuated by a well-known means (not shown) is brought into engagement with the set protrusion 16c and rotates the closing driver lever 16 in a counterclockwise direction into the position shown in FIG. 2 against the biasing force of the spring 16a. An engaging portion 16d is formed at the right end of the closing driver lever 16. A closing pawl 17 is pivoted to a shaft 17c and biased in a counterclockwise direction by a spring 17b. A spring 17b protrudes from the closing pawl 17 and is held between a spring retainer and the holddown pin 15d of the engaging pawl 15. A pawl 17a capable of engaging both the engaging portion 16d and holddown pin 15d is formed at one end of the closing pawl 17. A magnetic portion 17d is formed at the other end of the closing pawl 17. An electromagnet 18 held stationary by a holding member 18a is mounted on the base plate 2 and functions to attract and release the magnetic portion 17d. The electromagnet 18 is energized under control of a well-known electronic circuit (not shown) and attracts the magnetic portion 17d.

Referring next to FIG. 3, the second base plate 2 is provided with a window 2b through which the lower protrusion 15f protrudes downwardly. An upper protrusion 1b is formed on the upper surface of the first base plate 1. Accordingly, when the set of opening shutter blades 3 or the set of closing shutter blades 6 reaches the first position at which the blades are extended and fanned-out to cover the shutter openings 1a and 2a, the lower protrusion 15f pushes down the upper protrusion 4d or 7d. The upper protrusion 1b supports the lower surface of the shutter blade 3b or 6b, thus preventing the shutter blade 3b from bending downward. In this manner, the shutter blades 3a–3e or 6a–6e are urged into intimate contact with each other.

The operation of the shutter will next be described. In FIGS. 1 and 2, the shutter is in its set or charged state. The shutter set pins 14a and 14b move downward when the camera is set and rotate the opening driver lever 13 and the closing driver lever 16 in a counterclockwise direction against the springs 13a and 16a via the set protrusions 13c and 16c, respectively. The engaging portions 13d and 16d engage the pawls 15a and 17a, respectively, as shown in FIG. 2. In this state of FIG. 2, the opening driver lever 13 and the closing driver lever 16 are in their set state. The engaging pawl 15 has been rotated in a clockwise direction by the spring 15b. The holddown pin 15d pushes the pawl 17a to press the magnetic portion 17d against the electromagnet 18. At this time, the set of opening shutter blades 3 is in the first position and covers the shutter opening 1a, as shown in FIG. 1. The lower protrusion 15f engages the upper protrusion 4d of the opening arm 4, pushing down the opening shutter blade 3b, which is supported by the upper protrusion 1b as shown in FIG. 3, thereby improving the lightproofness between the successive blades. The set of closing shutter blades 6 is in the second position at which it is retracted to the left of the shutter opening 1a.

When the shutter is in its set or charged state as described above, if the release button (not shown) is depressed, the power supply is connected with the aforementioned electronic circuit (not shown). The electromagnet 18 is energized, attracting and holding the magnetic portion 17d of the closing pawl 17 under the state of FIG. 1. Then, the release button (not shown) is operated to push the working arm 15c of the engaging pawl 15 downward. The engaging pawl 15 is rotated in a counterclockwise direction against the force of the spring 15b. The counterclockwise rotation of the pawl 15 causes clockwise downward movement of the holddown pin 15d which stretches the spring 17b, applying a counterclockwise spring force to the closing pawl 17. Since the magnetic portion 17d is attracted by the electromagnet 18, the pawl 17 does not swing but stays in the position of FIG. 1.

The counterclockwise rotation of the engaging pawl 15 disengages the lower protrusion 15f from the upper protrusion 4d. Therefore, the opening shutter blades 3 are no longer urged toward the base plate 1 and thus can move freely. Furthermore, counterclockwise rotation of the engaging pawl 15 disengages the pawl 15a from the engaging portion 13d, whereupon the force of the spring 13a rotates the opening driver lever 13 in a clockwise direction to displace the opening shutter blades 3 to uncover the shutter openings 1a and 2a.

An exposure start signal is supplied to the electronic circuit before or after the rotation of the opening driver lever 13. A control circuit (not shown) determines the shutter speed and the aperture value, and starts an exposure operation, in the same manner as in the prior art. The electromagnet 18 is deenergized under control of the control circuit (not shown) thereby terminating the magnetic attraction between the electromagnet 18 and the magnetic portion 17d and releasing the closing pawl 17 for movement. The resilient force stored in the spring 17b then rotates the closing pawl 17 in a counterclockwise direction so that the pawl 17a is disengaged from the engaging portion 16d. Consequently, the closing driver lever 16 is rotated in a clockwise direction by the force of the spring 16a to displace the closing shutter blades 6 to cover the shutter openings 1a and 2a.

In this way, the opening driver lever 13 and the closing driver lever 16 are actuated in turn under control of the control circuit (not shown). The opening arm 4 and the closing arm 7 are actuated in turn to actuate the set of opening shutter blades 3 and the set of closing shutter blades 6. The set of opening shutter blades 3 uncovers the shutter openings 1a and 2a, and the set of closing shutter blades 6 closes the shutter openings with a predetermined delay to thereby effect an exposure. In this manner, the exposure operation is performed.

In the embodiment described above, the shutter blades 3a and 6a are translated between the first and second positions, while the shutter blades 3b–3e and 6b–7e are swung between the first and second positions. It is to be noted, however, that the invention is not limited to this structure. For example, a structure that is similar to the structure of the above embodiment may be adopted and in which all the shutter blades are translated.

Figure 4:
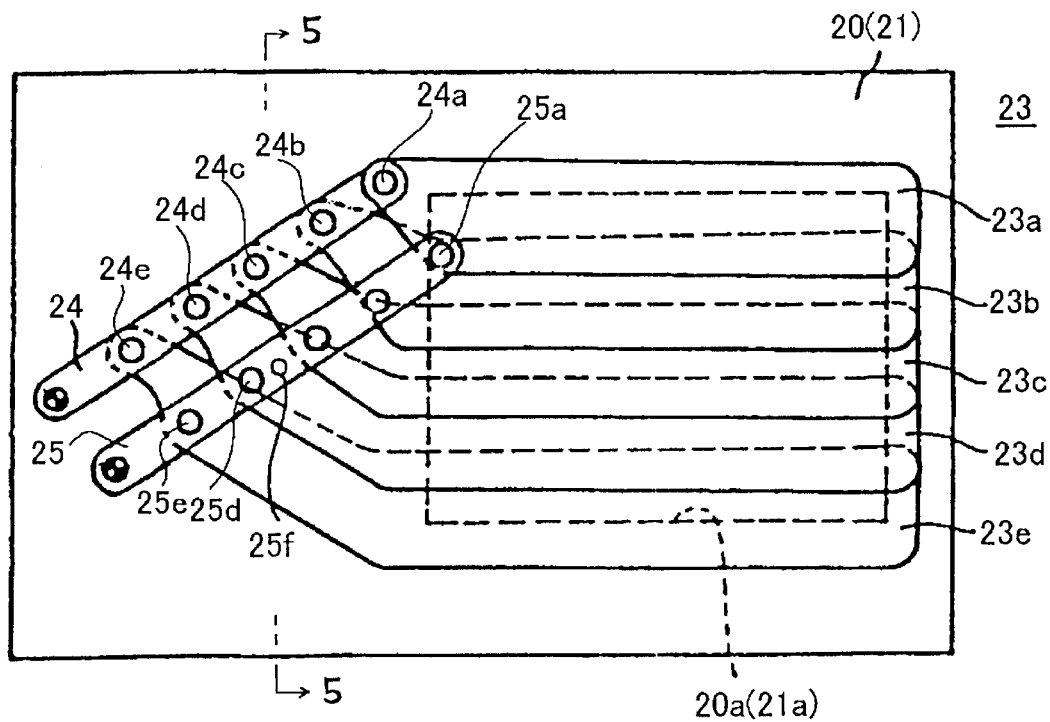
FIG. 4 is a plan view similar to FIG. 1, but showing another embodiment of the invention.
Figure 5:
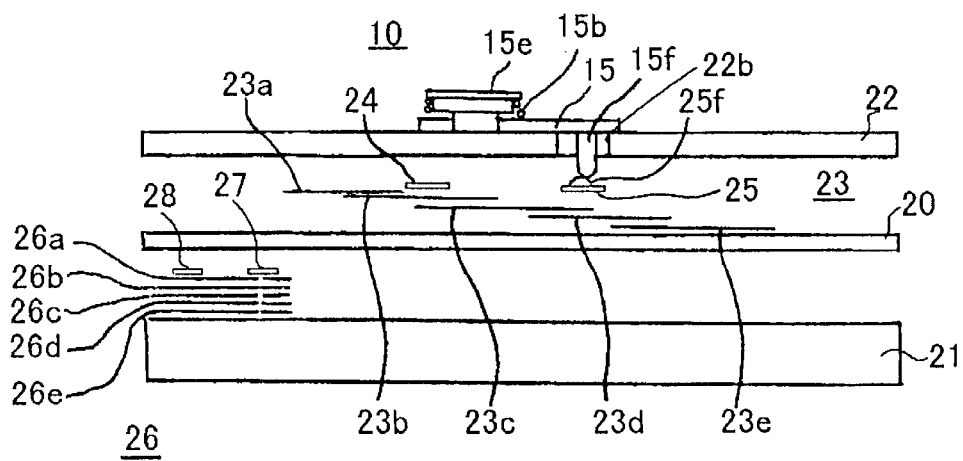
FIG. 5 is a cross-sectional view taken on line 5—5 of FIG. 4.

Referring to FIGS. 4 and 5, there is shown another embodiment of the invention. A first base plate 21 is located on the side of the picture-taking lens (not shown). A second base plate 22 is positioned on the side of the film surface. These two base plates 21 and 22 form a chamber for receiving shutter blades. A set of opening shutter blades 23 consisting of shutter blades 23*a*, 23*b*, 23*c*, 23*d*, and 23*e* is accommodated on the side of the second base plate 22 in the chamber. A set of closing shutter blades 26 consisting of shutter blades 26*a*, 26*b*, 26*c*, 26*d*, and 26*e* is accommodated on the side of the first base plate 21 within the chamber. A partition plate 20 having a shutter opening 20*a* is interposed between the set of opening shutter blades 23 and the set of closing shutter blades 26.

The set of opening shutter blades 23 is supported by opening arms 24 and 25. The shutter blades 23*a*–23*e* are connected to pins 24*a*–24*e*, 25*a*–25*e* standing upright from the arms 24 and 25, respectively. The opening shutter blades 23 are translated between first and second positions by swinging the opening arms 24 and 25 to cover and uncover the shutter opening. Similarly, the set of closing shutter blades 26 is connected to pins (not shown) standing upright from closing arms 27 and 28, respectively. The closing shutter blades 26*a*–26*e* are translated between first and second positions by swinging the closing arms 27 and 28 to cover and uncover the shutter opening.

An upper protrusion 25*f* is formed on the upper surface of the opening arm 25 and protrudes toward the second base plate 22. The shutter driver mechanism 10 already described in connection with FIG. 2 is mounted on the upper surface of the second base plate 22. The lower protrusion 15*f* formed on the lower surface of the engaging pawl 15 extends downward through a window 22*b* in the base plate 22 and can push down the upper protrusion 25*f*, in the same way as the FIGS. 1–3 embodiment described previously, to improve the lightproofness. Like components are indicated by like reference numerals in both embodiments.

FIG. 5 is a cross-sectional view of this shutter in its set state. The set of opening shutter blades 23 is in the first position and covers the shutter opening. The set of closing shutter blades 26 is in the second position and retracted to the left of the shutter opening. When the shutter is set in this way, if the release button (not shown) is depressed, the shutter operates similarly to the shutter in accordance with the FIGS. 1–3 embodiment. Prior to the start of an exposure, the engaging pawl 15 rotates to disengage the lower protrusion 15*f* from the upper protrusion 25*f*. Thus, the set of opening shutter blades 23 can move freely.

Figure 6:
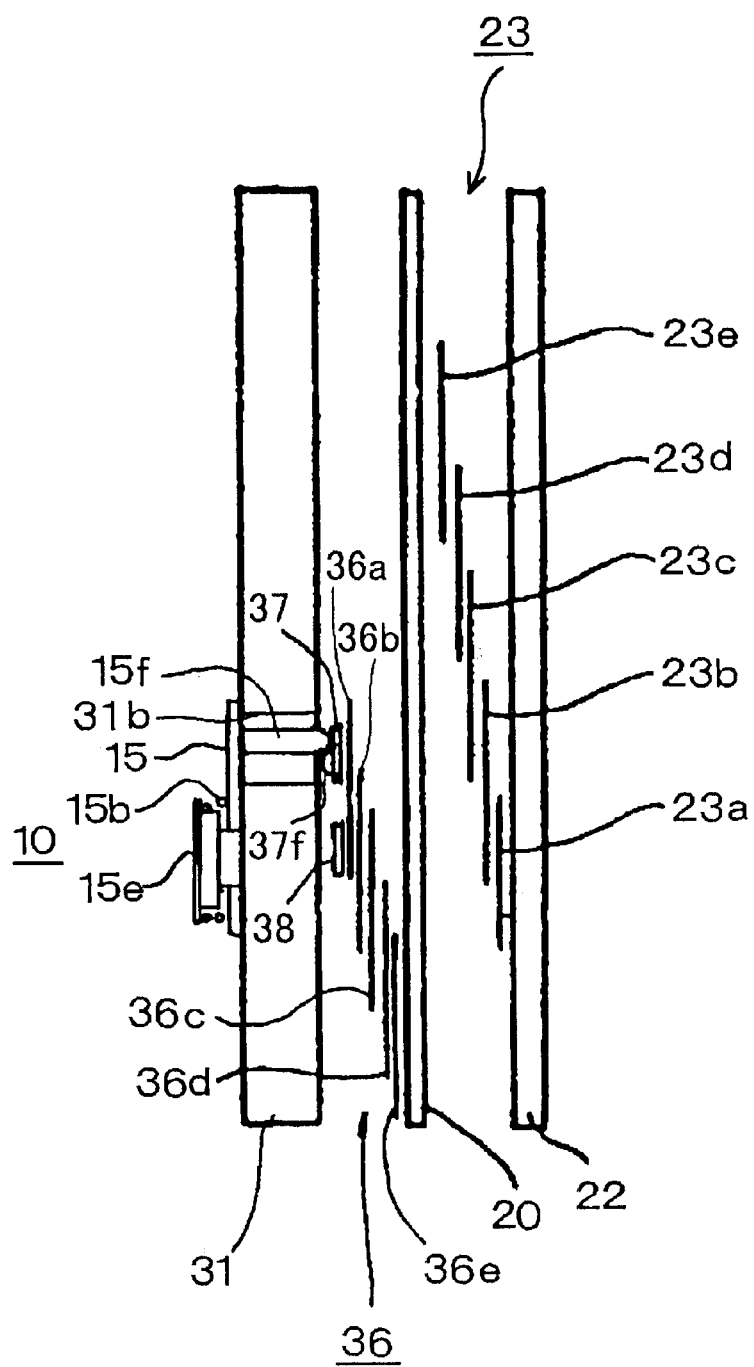
FIG. 6 is a cross-sectional view similar to FIG. 5, but showing a further embodiment of the invention.

Referring next to FIG. 6, there is shown a further embodiment of the invention. In this embodiment, a set of closing shutter blades 36 covers a part of the shutter opening when the shutter is in its set state. An upper protrusion 37*f* is formed on an arm 37 for closing the set of closing shutter blades 36. The lower protrusion 15*f* of the shutter driver mechanism 10 pushes the set of closing shutter blades 36 into intimate contact with the set of opening shutter blades 23. Like components are indicated by like reference numerals in various embodiments including this embodiment.

In this embodiment, the engaging pawl 15 rotates to retract the lower protrusion 15*f*. Then, the set of closing shutter blades 36 is driven downward to thereby open the shutter opening once. Subsequently, the set of opening shutter blades 23 is operated to start exposure.

In the above embodiments, the set of opening or closing shutter blades is pushed in one direction by the engaging pawl 15 included in the shutter driver mechanism 10. The present invention is not limited thereto. The concept of the present invention can be embodied in any form as long as the pushing member operates before the start of operation of the opening shutter blades. For instance, the engaging pawl may be caused to stop pushing the opening shutter blades by a member interlocking with the mirror box of a single-lens reflex camera. In a lens shutter having one or two sets of blades, protrusions may be formed on base plates in such a direction as to bring the blades into intimate contact with each other only when the opening is closed. The pushing operation may be stopped by a set lever or the like that operates prior to the start of an exposure. Furthermore, protrusions may be formed on the subsequent blades. In addition, each blade may have a protrusion.

As described, the present invention provides a camera shutter that is quite simple in structure and which has improved lightproofness without requiring any sophisticated machining or processing technique. By contrast, in the past, it was common to crimp the shutter blades in a direction to bring them into intimate contact with each other. Furthermore, in the shutter in accordance with the invention, no friction is exerted between the blades, unlike the prior art structure fabricated using a crimping operation. Consequently, the operation of the shutter is made smoother, and the exposure time can be controlled more accurately.

What is claimed is:

1. A shutter for use in a camera, comprising:
   at least two base plates having a shutter opening;
   a plurality of separate shutter blades mounted to undergo movement between the base plates;
   a shutter driver mechanism for moving the shutter blades between a first position at which the shutter blades cover the shutter opening and a second position at which the shutter blades are retracted from and do not cover the shutter opening; and
   a pushing member protruding from one of the base plates toward the shutter blades in the first position to push the shutter blades into intimate contact with each other, the pushing member being operable to stop pushing the shutter blades prior to start of an exposure.

2. A shutter according to claim 1; wherein at least one of the shutter blades has a protrusion engageable with the pushing member when the shutter blades are in the first position.

3. A shutter according to claim 2; wherein the pushing member is incorporated in the shutter driver mechanism.

4. A shutter according to claim 1; wherein the pushing member is incorporated in the shutter driver mechanism.

5. A shutter for use in a camera, comprising:
   means defining a shutter opening;
   a plurality of shutter blades displaceable to a first position wherein the shutter blades are fanned-out in overlapping relation to cover the shutter opening and a second position wherein the shutter blades are retracted from and do not cover the shutter opening;
   a shutter driver mechanism operative to displace the shutter blades to the first and second positions; and
   a pushing member cooperative with the shutter driver mechanism to push the shutter blades into close contact with one another when the shutter blades are fanned-out in the first position to enhance lightproofness of the shutter and to discontinue pushing the shutter blades prior to start of an exposure thereby freeing the shutter blades to undergo displacement.

6. A shutter according to claim 5; wherein the pushing member is positioned so as to be driven by the shutter driver mechanism to discontinue pushing the shutter blades prior to start of an exposure.

7. A shutter according to claim 6; wherein the pushing member is positioned on an element of the shutter driver mechanism.

8. A shutter according to claim 7; wherein at least one of the shutter blades has a protrusion, the protrusion being engageable with the pushing member when the shutter blades are fanned-out in the first position.

9. A shutter according to claim 7; further including a protrusion disposed on one of the shutter blades or on an element that moves in synchronism with the shutter blades, the pushing member being movable into engagement with the protrusion by the shutter driver mechanism during charging of the shutter to thereby urge the shutter blades into close contact with one another while the shutter blades are in the first position.

10. A shutter according to claim 9; wherein the pushing member is movable out of engagement with the protrusion by the shutter driver mechanism prior to start of an exposure to thereby free the shutter blades for displacement.

11. A shutter according to claim 10; wherein the plurality of shutter blades comprises a set of opening shutter blades and a set of closing shutter blades both displaceable to first and second positions to cover and not cover the shutter opening; and wherein the pushing member pushes at least one of the sets of opening and closing shutter blades when the same is in the first position.

12. A shutter according to claim 11; wherein the pushing member pushes each set of opening and closing shutter blades when the same is in the first position.

13. A shutter according to claim 5; wherein at least one of the shutter blades has a protrusion, the protrusion being engageable with the pushing member when the shutter blades are fanned-out in the first position.

14. A shutter according to claim 5; further including a protrusion disposed on one of the shutter blades or on an element that moves in synchronism with the shutter blades, the pushing member being movable into engagement with the protrusion by the shutter driver mechanism during charging of the shutter to thereby urge the shutter blades into close contact with one another while the shutter blades are in the first position.

* * * * *